3,629,348
Patented Dec. 21, 1971

3,629,348

PROCESS FOR PRODUCING 5-ALKYLIDENE-2-NORBORNENES

Constantine I. Courduvelis, New Haven, and Thomas J. Brett, Jr., Cheshire, Conn., assignors to Uniroyal, Inc., New York, N.Y.

No Drawing. Filed Aug. 8, 1969, Ser. No. 848,720
Int. Cl. C07c *5/24*
U.S. Cl. 260—666 8 Claims

ABSTRACT OF THE DISCLOSURE

5 - alkenyl - 2-norbornenes (such as 5-vinyl-2-norbornene) are isomerized to corresponding 5-alkylidene-2-norbornenes (e.g., 5-ethylidene-2-norbornene, a monomer useful as the diene in making EPDM rubber) with the aid of various one-component or two-component catalysts. One-component catalysts include alkali metal amides or hydrazides such as lithiumdimethylamide. Two-component catalysts include combinations of (1) alkali metal or alkali metal compound such as alkali metal-amide, -hydrazide, -hydride, -alkyl, -hydroxide, or alkoxide, with (II) certain carbonamides (e.g., tetramethylurea) sulfinamides (e.g., tetramethylsulfinamide), sulfonamides, or silicic diamides.

BACKGROUND OF THE INVENTION

(1) Field of the invention

This invention relates to a process for producing 5-alkylidene-2-norbornenes.

(2) Description of the prior art 5-alkylidene-2-norbornenes, including 5-ethylidene-2-norbornene (also called 5-ethylidene-2-bicyclo [2,2,1] heptene), which has the formula:

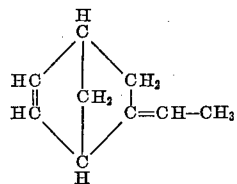

are known compounds. 5-ethylidene-2-norbornene in particular is of interest for use as a diene for copolymerization with ethylene and propylene to make sulfur-vulcanizable unsaturated EPDM terpolymer rubber.

Recently, a number of methods have been disclosed for producing 5-ethylidene-2-norbornene. Those based on isomerization of alkyl norbornadienes (U.S. Pat. 3,151,173 to Nyce; French Pat. 1,478,766 to C. A. Cohen) have the disadvantage that the synthesis of norbornadienes is not as economical as would be desirable. Alkenyl norbornenes, on the other hand, can be produced much more feasibly, from cyclopentadiene and conjugated dienes. Their subsequent isomerization to alkylidene norbornenes can be carried out by various known methods (e.g., U.S. Pat. 3,347,944, Fritz et al.). However, it has been desired to provide a more satisfactory process, particularly from the standpoint of economy, efficiency, and operational simplicity.

SUMMARY OF THE INVENTION

The present method of isomerization of a 5-alkenyl-2-norbornene to the corresponding 5-alkylidene-2-norbornene involves contacting the 5-alkenyl-2-norbornene with a catalyst which may be (A) a one-component catalyst, or (B) a two-component catalyst.

The one-component catalyst (A) is an alkali metal amide- or hydrazide-type compound containing at least one alkali metal atom bonded to nitrogen.

The two-component catalyst (B) comprises a first component (I) and a second component (II). The first component is either (i) an alkali metal amide- or hydrazide- type chemical as defined for the aforesaid one-component catalyst (A), or (ii) an alkali metal itself, or an alkali metal-hydride, -hydrocarbyl, -hydroxide, or -hydrocarbyloxide.

The second component (II) of the two-component catalyst (B) is a carbonic, silicic, sulfinic or sulfonic diamide.

DETAILED DESCRIPTION AND PREFERRED EMBODIMENTS

The 5-alkenyl-2-norbornenes which can be isomerized by the present process have the general formula:

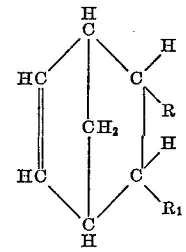

where R is hydrogen or a hydrocarbon radical having for example up to 20 carbon atoms, such as alkyl (e.g., methyl, ethyl, n-propyl, isopropyl, n-butyl, isobutyl, secondary butyl, tertiary butyl, pentyl, hexyl, nonyl, dodecyl, etc.), aryl (e.g., phenyl, biphenyl, naphthyl, etc.), aralkyl (e.g., phenylmethyl, phenylethyl, etc.,) alkylaryl (ethyl phenyl, tolyl, etc.), cycloalkyl (e.g., cyclopentyl, cyclohexyl, etc.) and $R^1$ is an alkenyl radical having from 2 to 15 carbon atoms, (e.g., vinyl, propenyl [including allyl], isopropenyl, butenyl, isobutenyl, pentenyl, hexenyl, heptenyl, etc. and their isomers, (e.g., 2-methyl-3-butenyl, 2,3-dimethyl-2-butenyl, 5-heptenyl, etc.) or aralkenyl having from 8 to 15 carbon atoms (such as 1-phenyl-ethenyl, 2-phenyl-2-propenyl, 1-napthyl-2-butenyl, etc.). Examples of such 5-alkenyl-2-norbornenes are 5-vinyl-2-norbornene; 5 - propen - 2 - yl - 2 - norbornene, 5-isopropenyl-2-norbornene, 5 - buten-2-or-3-yl-2-norbornene, 5-penten-4-yl-2-norbornene, 5-(2-phenylvinyl)-2-norbornene, etc.

The foregoing 5-alkenyl-2-norbornenes are converted, by the method of the invention, into the corresponding 5-alkylidene-2-norbornenes of the formula

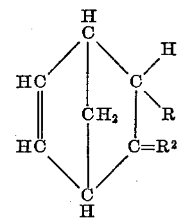

where R is as previously defined and $R^2$ is the radical resulting from the isomerization of the alkenyl radical $R^1$ as previously defined, that is, $R^2$ is an alkylidene radical having from 2 to 15 carbon atoms or an aralkylidene radical having 8 to 15 carbon atoms. Examples of such chemicals are 5-ethylidene-2-norbornene, 5-propylidene-2-norbornene, 5-isopropylidene-2-norbornene, 5-butylidene-2-norbornene, 5-isobutylidene-2-norbornene, 5-sec-butylidene - 2 - norbornene, 5 - pentylidene - 2 - norbornene, 5-(2-phenylethylidene)-2-norbornene, etc.

As indicated previously, the isomerization of the 5-alkenyl-2-norbornene to the corresponding 5-alkylidene-2-norbornene is accomplished by contacting the 5-alkylene, 2-norbornene with an isomerization catalyst. As stated above, the isomerization catalyst may be either (A) a one-component catalyst, or (B) a two-component catalyst.

(A) THE ONE-COMPONENT CATALYST

The one-component catalysts are alkali metal amide- or hydrazine-type compounds containing at least one alkali metal-nitrogen bond; the nitrogen atom(s) may be part of an open chain, or in a ring structure. Many such amides or hydrazides may be represented by the formula:

$$M—N\begin{matrix} X \\ Y \end{matrix}$$

wherein M is an alkali metal and may not only be one of the common alkali metals, namely, sodium, potassium or lithium, but may also be rubidium, cesium, or francium. X may be M or $R^3$, where M is as previously defined and $R^3$ is hydrogen or hydrocarbyl, especially a monovalent hydrocarbon radical usually having up to 20 carbon atoms, and may be, for example, alkyl (e.g. methyl, ethyl, n-propyl, isopropyl, n-butyl, isobutyl, secondary-butyl, tertiary-butyl, hexyl, nonyl, dodecyl, etc.), aryl (e.g., phenyl, biphenyl, naphthyl, etc.), aralkyl (e.g., phenylmethyl, phenylethyl, etc.), alkaryl (tolyl, ethyl phenyl, xylyl), cycloalkyl (e.g., cyclopentyl, cyclohexyl, etc.) or alkenyl (such as vinyl, allyl, isopropenyl, etc.). Y may be $R^3$ as previously defined, or one of the groups

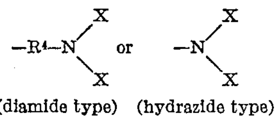

(diamide type) (hydrazide type)

where $R^4$ denotes an alkylene diradical of from 1 to 3 carbon atoms and X is as previously defined. Examples of such catalysts are lithium dimethylamide, sodamide, potassium diphenylamide, potassium dicyclohexylamide, rubidium methyl hexyl amide, sodium diallylamide, sodium methyl allyl amide, potassium divinyl amide, N,N'-dilithio-N,N'-dimethyl ethylenediamide, disodioethyl amide, sodium hydrazide, tetrasodium hydrazide, sodium triphenyl hydrazide, dilithiodimethylhydrazide, and the like. In the above catalyst formulas hydrocarbon radicals may be connected together to provide ring structures including one nitrogen atom as in lithium pyrrolidide, cesium piperidide, and pyrolino potassium, or to provide ring structures including more than one nitrogen atom, e.g., two or three nitrogen atoms, as in mono- or dilithium piperazide, trilithio hexahydrotriazide, etc.

The foregoing catalysts are referred to as "one-component catalysts" in the sense that only one chemical is required to produce the desired isomerization. However, the expression "one-component catalyst" is not intended to exclude the possibility of employing simultaneously more than one chemical of the foregoing type.

(B) THE TWO-COMPONENT CATALYSTS

The two-component catalysts (B) employed in the invention comprise a first component (I) and a second component (II). The first component (I) may be (i) an amide- or hydrazide-type chemical as previously set forth in the above description of the one-component catalyst (A). Alternatively, the first component (I) of the two-component catalyst (B) is typically (ii) a substance of the formula $M(Z)_n$ where M is an alkali metal as previously defined, $n$ is 0 or 1 and Z is selected from (a) $R^3$ as previously defined (i.e., hydrogen or hydrocarbyl), or (b) a radical of the formula $—OR^3$ where $R^3$ is a previously defined, that is $—OR^3$ is hydroxyl or oxyhydrocarbyl.

Thus, when $n$ is zero in the formula $M(Z)_n$, component (I) of the two-component catalyst (B) is the alkali metal itself. Alloys of alkali metals may also be used as component (I).

When $n$ is 1 and Z is as defined in (a), the component (I) is either an alkali metal hydride ($R^3$ as hydrogen), e.g., sodium hydride, potassium hydride, lithium hydride, etc. or such alkali metal hydrocarbyl compounds ($R^3$ as hydrocarbyl) as butyl lithium, francium-tert.-butyl, 1,2-dilithio-1,2-diphenylethane, vinyl-lithium, sodiumacetylide, potassiumphenyl, potassiumallyl, rubidiumphenyl, cesiumnaphthyl, etc.

Suitable chemicals of the (b) category include lithium hydroxide, sodium methoxide, potassium-tertiary-butoxide, rubidium benzoxide, cesiumphenoxide, francium-neopentyloxide, etc.

As for the second component (II) of the two-component catalyst (B) this may as indicated be a carbonic, silicic, sulfinic or sulfonic diamide. Typical components of this kind have the formula

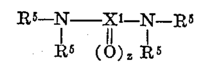

where $X^1$ is carbon, silicon, or sulfur, $z$ is 1 when $X^1$ is carbon or silicon and $z$ is 1 or 2 when $X^1$ is sulfur, and the $R^5$'s are the same or different monovalent hydrocarbon radicals as previously defined for $R^3$. Examples include N,N'-tetramethyl carbonic diamide (more commonly called tetramethylurea), N,N'-tetramethyl silicic diamide, N,N'-tetramethylsulfinic diamide (more commonly called tetramethylsulfinamide), N,N'-tetramethyl sulfonic diamide (more commonly called tetramethyl sulfonamide), N,N'-tetraethylurea, N,N'-tetrapropylurea, N,N'-tetraphenylurea, N,N'-tetrapentyl silicic diamide, N,N'-tetraphenyl sulfinic diamide, N,N'- tetradodecyl carbonic diamide, N,N'-tetracyclohexyl sulfonic diamide, N,N'-diethylene silicic diamide, N,N'-bis(tetramethylene) sulfonic diamide, N-divinyl-N'-dimethyl sulfonic diamide, N-dimethyl-N'-diethyl sulfinic diamide, N-diethyl-N'-diphenyl sulfonic diamide, N-trimethylene-N'-depentyl silicic diamide, N,N'-bis(methyl, ethyl) urea, N-diallyl-N'-diethyl carbonic diamide, N,N'-bis(methyl, phenyl) urea, N-methyl, phenyl-N'-methyl, phenyl silicic diamide, N-decyl, ethyl-N'-decyl, ethyl sulfinic diamide, N-isopentyl, methyl-N'-dicyclopentyl sulfonic diamide, N-allyl, methyl-N'-diethyl sulfinic diamide, N,N'-ethylene-N,N'-dimethyl silicic diamide, N-dimethyl-N'-diethylurea, N-dimethyl-N'-diphenylurea, etc.

In the two-component catalyst system (B), the two components, namely, component (I) and component (II) as defined above, are employed in weight ratio of from 100/1 to 1/1000. The preferred ratio usually falls within the range from 10/1 to 1/100.

It will be noted that certain of the ingredients of the two-component catalyst may be used alone as a one-component catalyst. However, it will generally be found that more satisfactory results, particularly from the standpoint of catalyst efficiency and speed of the reaction, are obtained in the two-component catalyst systems.

The expression "two-component catalyst" is intended to indicate that in such system both a type (I) chemical and a type (II) chemical are employed. However, the expression is not intended to exclude the use of more than one type (I) chemical [along with, of course, at least one type (II) chemical], or more than one type (II) chemical [along with, of course, at least one type (I) chemical].

The described isomerization catalyst may be contacted with the 5-alkenyl-2-norbornene to be isomerized in any suitable manner. In the case of the two-component catalyst system (B), the two catalyst components (I) and (II) may be brought together before contacting with the 5-alkenyl-2-norbornene to be isomerized, or the two catalyst components may be brought together, in any order, in the presence of the 5-alkenyl-2-norbornene. It is not necessary to have a solvent medium for the isomerization reaction, but, if desired, a solvent may be used, for example to facilitate heat transfer. The solvent, if used, should be one which will not interfere with the reaction. Saturated hydrocarbon liquids, whether paraffinic or aromatic hydrocarbons, such as hexane, iso-octane, decane, octadecane, benzene, xylene, etc. may be employed. In the typical practice of the invention the reaction mixture consists essentially of the material to be isomerized and the defined catalyst, with or without an inert hydrocarbon solvent.

The isomerization of the 5-alkenyl-2-norbornene to the desired 5-alkylidene-2-norbornene under the influence of the catalyst takes place at ordinary ambient temperatures (e.g., 20° C.) or even at lower temperatures (e.g., −20° C.), but in practice it is frequently desirable to speed up the process by heating the mixture to an elevated temperature, and quite highly elevated temperatures (e.g., 200 or 250° C.) may be employed if desired. A preferred reaction temperature range in many cases is 20 to 180° C.

The rate of isomerization depends on such factors as the concentration of catalyst in the reaction mixture, the temperature at which the reaction is carried out, the particular catalyst ingredients chosen, and the particular 5-alkenyl-2-norbornene being isomerized. The ratio of catalyst to 5-alkenyl-2-norbornene may be varied between 500/1 to 1/100, the preferred ratio being from about 10/1 to 1/10, by weight. In some cases the reaction may proceed so rapidly that a substantial amount of 5-alkylidene-2-norbornene is formed within a few minutes; in other cases a reaction period of several weeks may elapse before substantially all of the 5-alkenyl-2-norbornene has been isomerized.

The following examples, in which all quantities are expressed by weight unless otherwise indicated, will serve to illustrate the practice of the invention in more detail.

EXAMPLE 1

Into a 200 ml. flat-bottomed 3-neck flask equipped with a condenser, magnetic stirrer and blanketed with dry nitrogen is added 67 g. of vinylnorbornene and 2.5 g. of sodium. Upon heating the flask contents to 110° C. the sodium metal melts, and by vigorous agitation for ½ hour at 110° C. the liquid sodium breaks up into small droplets. The agitation is stopped and the flask contents allowed to cool to 28° C. Slight agitation is then started again and 63 g. of tetramethylurea is charged. After 48 hours at 28° C. the undissolved sodium, 1.5 g., is removed and the liquids are vacuum distilled (40–80° C.) at 20 mm. Hg. 124.5 g. of a distillate is recovered whereas 4.5 of a residue remained in the flask gas chromatographic analysis indicates that three components are present in the distillate: vinylnorbornene, ethylidenenorbornene and tetramethylurea. The latter is removed by a water wash and the remaining product again analyzed by gas chromatographic. The mixture consists of 75% ethylidenenorbornene and 25% vinylnorbornene. No tetramethylurea is found in this mixture.

EXAMPLE 2

To a 50 ml. 3-neck round bottom flask equipped with a stirrer and a reflux condenser is added (under a blanket of dry nitrogen) 4 grams of sodium in small pieces and 18 grams of tetramethylurea (a liquid) while agitating the flask contents. Twenty grams of 5-vinyl-2-norbornene is charged and the total mixture is heated to 110° C. After two hours at 110° C., a sample is drawn from the reaction mixture and mixed with 2–3 times its volume of water in a separatory funnel. The hydrocarbon layer is separated and dried with anhydrous magnesium sulfate. Analysis of the sample by gas-liquid chromotography indicates that all of the 5-vinyl-2-norbornene has been isomerized to 5-ethylidene-2-norbornene.

EXAMPLE 3

Tetramethylurea, sodium metal in small pieces and 5-vinyl-2-norbornene are added to a flask as in Example 2. The quantities of the ingredients used, as well as the reaction conditions, are summarized in Table I.

TABLE I.—ISOMERIZATION OF 5-VINYL-2-NORBORNENE

| Experiment No. | (1) | (2) | (3) | (4) |
|---|---|---|---|---|
| Tetramethylurea, grams | 2.0 | 2.0 | 4.0 | 4.0 |
| Sodium metal, grams | 0.5 | 0.5 | 0.5 | 0.5 |
| 5-vinyl-2-norbornene, grams | 2.0 | 2.0 | 2.0 | 2.0 |
| Reaction temperature, ° C | 28.0 | 28.0 | 28.0 | 28.0 |
| Reaction period, days | 4 | 11 | 4 | 11 |
| 5-ethylidene-2-norbornene yield, percent | 14 | 78 | 21 | 98.5 |

EXAMPLE 4

Potassium 0.2 gram, tetramethylurea 5 ml. and 5-vinyl-2-norbornene 5.3 grams, are reacted as in Example 2, to give, after 1 hour at 100° C., 50% conversion of 5-vinyl-2-norbornene into 5-ethylidene-2-norbornene.

EXAMPLE 5

Into a 3-neck flask bearing a condenser, a motor driven stirrer, a thermometer and blanketed with nitrogen, there is added 36.5 grams of fine glass powder. The powder is stirred for two hours at 180° C. and 25 grams of sodium is then added in small pieces one at a time over a 5 minute period. Stirring is continued for 1 hour at 160–170° C., after which the powder is slimy due to the sodium coating. Ten grams of this sodium coated glass (high surface sodium) is heated in a flask as in Example 2 with 6.5 grams of 5-vinyl-2-norbornene at 110° C. for two hours. No isomerization takes place. 4 ml. of tetramethylurea is added to the flask and heated for 1 hour at 110° C., after which 85% conversion of 5-vinyl-2-norbornene to 5 - ethylidene-2-norbornene has taken place.

EXAMPLE 6

Into a 3-neck flask equipped with motor driven stirrer, Dry Ice acetone condenser and protected by a nitrogen blanket is added 25 ml. of a 15% by weight solution of n-butyllithium in n-hexane. The flask is cooled Dry Ice, and the stirrer is turned on while about 15 ml. of dry dimethylamine is allowed to distill into the flask through the Dry Ice acetone condenser. The solution is agitated for ½ hour at Dry Ice temperature and allowed to stay at room temperature without agitation. The following day crystals of lithium dimethylamide are separated from the supernatant n-hexane. To this is added 9 ml. of 5-vinyl-2-norbornene and 6½ ml. of tetramethylurea. After 48 hours at room temperature, 85% conversion of 5-vinyl-2-norbornene to 5-ethylidene-2-norbornene has taken place.

EXAMPLE 7

A small dry bottle is cooled under nitrogen and closed by a serum cap. To the bottle are injected with a syringe 5 ml. of 15% by weight n-butyllithium in n-hexane, 1 ml. of 5-vinyl-2-norbornene and 2 ml. of tetramethylurea. After 8 days at room temperature, 100% conversion to 5-ethylidene-2-norbornene takes place.

EXAMPLE 8

Five ml. of a 15% by weight of solution of n-butyllithium in n-hexane, 2 ml. of 5-vinyl-2-norbornene and 1 ml. of tetrahydrofurane are reacted as in Example 7 for 48 hours at room temperature. No 5-ethylidene-2-norbornene is formed.

EXAMPLE 9

To a dry 100 ml. capacity 3-neck round bottom flask equipped with a stirrer, Dry Ice acetone condenser and flushed with dry nitrogen is added under agitation 25 ml. of a 15% by weight solution of lithiumbutyl in n-hexane solution and 15 ml. of freshly distilled dimethylamine. The Dry Ice condenser is removed from the flask 1 hour after the dimethylamine charge and the reaction is kept at room temperature for 24 hours while still blanketed by dry nitrogen. By then crystals of the product, lithiumdimethylamide, precipitate from the solution. The supernatant liquid is decanted and a dry nitrogen flush is maintained. To the above flask containing the lithiumdimethylamide, 9 ml. of 5-vinyl-1-norbornene is charged, and the reaction mixture is agitated at room temperature for 48 hours. The flask contents are then treated with water as indicated in Example 2, and the 5-vinyl-2-norbornene/5-ethylidene-2-norbornene mixture is isolated. Gas chromatographic analysis indicates that 70% of the original 5-vinyl-2-norbornene has been isomerized to 5-ethylidene-2-norbornene.

EXAMPLE 10

In this example, the catalyst component (I) is lithium pyrrolidide, prepared in situ. Into a 250 ml. flat bottom flask equipped with a condenser, a magnetic stirrer and blanketed by nitrogen were added 40 g. of vinylnorbornene and 5 g. of pyrrolidine. 30 ml. of a 2.2 molar solution of butyllithium in hexane was added slowly, while the content of the flask was agitated. Then 20 milliliters of tetramethyl-urea was added and the solution was stirred for 20 hours at 25° C. The reaction mixture was vacuum distilled to give a distillate of 68 g. and a residue of 12.5 g. Gas chromatographic analysis indicated that 87% of the vinylnorbornene had been isomerized to ethylidene norbornene.

EXAMPLE 11

Into a 100 ml. round bottom flask equipped with condenser, magnetic stirrer and blanketed by nitrogen was added 1.5 g. of sodium hydride (obtained from a 56% dispersion of it in mineral oil by washing off the latter with hexane under nitrogen). Vinylnorbornene, 5 ml. and tetramethylurea 10 ml. were added and the mixture was stirred at 125° C. for 2 hours. The reaction mixture worked up with water as in the previous example and analyzed by gas liquid chromatography was found to have 50% of the vinylnorbornene isomerized into ethylidene norbornene.

Having thus described our invention, what we claim and desire to protect by Letters Patent is:

1. A process for producing a 5-alkylidene-2-norbornene comprising in combination the steps of (1) providing a 5-alkenyl-2-norbornene wherein the alkenyl group has from 2 to 5 carbon atoms;

(2) contacting the said 5-alkenyl-2-norbornene with an isomerization catalyst which is a two-component catalyst having a first component (I) and a second component (II), said first component (I) being selected from the group consisting of (i) and (ii), the said (i) being an alkali metal amide of the formula $$M-N\begin{matrix}X \\ R^3\end{matrix}$$

where M is an alkali metal, X is M as previously defined or $R^3$, and $R^3$ is hydrogen or alkyl having up to 12 carbon atoms, and the said (ii) being a substance of the formula $$M(R^3)_n$$

where M is as previously defined, $n$ is 0 or 1 and $R^3$ is as previously defined, the said second component (II) being an N,N'-tetralkyl urea wherein the alkyl groups have up to 12 carbon atoms, and (3) maintaining the said 5-alkenyl-2-norbornene and the said isomerization catalyst in contact at temperature within the range of from −20° C. to 250° C. until the said 5-alkenyl-2-norbornene has been isomerized to the corresponding 5-alkylidene-2-norbornene.

2. A process for producing 5-ethylidene-2-norbornene comprising in combination the steps of (1) providing 5-vinyl-2-norbornene;

(2) contacting the said 5-vinyl-2-norbornene with an isomerization catalyst which is a two-component catalyst having a first component (I) and a second component (II), the said component (I) being selected from the group consisting of sodium
potassium
lithiumdimethylamide
n-butyl lithium
lithium pyrrolidide, and
sodium hydride, and the said second component (II) being tetramethylurea, and (3) maintaining the said 5-vinyl-2-norbornene and the said isomerization catalyst in contact at a temperature within the range of from 20 to 180° C., the ratio of catalyst to 5-vinyl-2-norbornene being from 500/1 to 1/100, and the ratio of catalyst component (I) to catalyst component (II) being from 100/1 to 1/1000, until the said 5-vinyl-2-norbornene has been isomerized to 5-ethylidene-2-norbornene.

3. A process as in claim 2 wherein the said (I) is sodium.

4. A process as in claim 2 wherein the said (I) is potassium.

5. A process as in claim 2 wherein the said (I) is lithiumdimethylamide.

6. A process as in claim 2 wherein the said (I) is n-butyllithium.

7. A process as in claim 2 wherein the said (I) is lithium pyrrolidide.

8. A process as in claim 2 wherein the said (I) is sodium hydride.

References Cited

UNITED STATES PATENTS 3,347,944 10/1967 Fritz et al. ---------- 260—666

DELBERT E. GANTZ, Primary Examiner
V. O'KEEFE, Assistant Examiner